Dec. 6, 1955     M. A. GOULD ET AL     2,726,026
BEVERAGE VENDING MACHINES
Filed March 18, 1952     6 Sheets-Sheet 1

INVENTORS:
Marcus A. Gould &
BY Walter W. Tufford

FIG. 3

Dec. 6, 1955 M. A. GOULD ET AL 2,726,026
BEVERAGE VENDING MACHINES
Filed March 18, 1952 6 Sheets-Sheet 4

INVENTORS:
Marcus A. Gould &
BY Walter W. Tufford

Dec. 6, 1955   M. A. GOULD ET AL   2,726,026
BEVERAGE VENDING MACHINES
Filed March 18, 1952   6 Sheets-Sheet 6

INVENTORS:
Marcus A. Gould &
Walter W. Tufford
BY

United States Patent Office 2,726,026
Patented Dec. 6, 1955

2,726,026

BEVERAGE VENDING MACHINES

Marcus A. Gould and Walter W. Tufford, San Diego, Calif.

Application March 18, 1952, Serial No. 277,244

16 Claims. (Cl. 226—46.4)

The present invention relates in general to the art of vending machines and is particularly directed to an improved machine for dispensing heated beverages in individual cups or receptacles in which the beverage is prepared by the infusion of hot water or other liquid with a powdered ingredient. One of the primary objects of the present invention resides in the provision of a hot beverage vending machine of this type in which the successive steps of releasing and positioning the receptacles within the machine, injecting the powdered ingredient into the receptacle, infusing the heated liquid, and then delivering the receptacle with the beverage to the customer are all accomplished by simple, mechanical means responsive to operation of the machine by a customer. By eliminating the relatively complex conventional electrical components and controls for sequencing and timing the operations, an arrangement is provided which is positive, inexpensive from the standpoint of manufacture, and which requires a minimum of maintenance. These considerations are recognized in the vending machine art as being of primary importance in attaining economic success.

A further objective of the invention is to provide a hot beverage vending machine which is unusually compact and therefore requires a minimum of space, while having a large storage capacity for receptacles and the beverage-forming ingredients by reason of the efficiency of the arrangement in space utilization.

Still another object of the invention is to provide a vending machine of this character wherein the actuation is entirely mechanical and requires a minimum of simple, readily accomplished manual operations on the part of the customer in order to select the desired beverage and effect its preparation and delivery.

In vending machines of the character in which a liquid is infused with a powdered ingredient in a receptacle such as a paper cup to form the beverage, it heretofore has been found difficult to provide simple and inexpensive means for accurately and positively controlling the amount of liquid injected in each of the cups or receptacles prior to delivery of the latter to the customer. In the present machine, this function is accomplished by a positive yet simple metering means which permits continuous operation of the machine with accurately controlled liquid measure and in which over-running and consequent spillage is prevented.

Another problem that exists in vending machines for beverages formed from powdered ingredients has resided heretofore in the difficulty of maintaining the powdered ingredients in a perfectly dry condition while they are stored in the machine so that they retain their beverage-forming qualities and are free-flowing. The present invention overcomes this problem by the provision of sealed containers for the powdered ingredients which are adapted to be replaced when emptied, and a positive means for sealing the containers when supported in the machine incorporating novel means for accurately dispensing predetermined amounts of the powder from the container without exposing the remaining material to the atmosphere, thereby maintaining the original fresh conditions of the powdered ingredients as well as their ability to flow readily and quickly pass into solution.

In addition to the foregoing, the vending machine of the present invention is characterized as including a central, rotatable storage means for nested stacks of the receptacles, means for successively and positively releasing receptacles from the nested stacks into a delivery position within the machine, a support rack for a plurality of containers adapted to store the powdered ingredients and being further adapted to be coaxially rotatable with the receptacle storage means in response to selective operation by the customer, means for discharging a predetermined amount of the powdered ingredient into a receptacle in the delivery position, means for storing a liquid and maintaining it at a predetermined elevated temperature, means for discharging a predetermined amount of the liquid into the positioned receptacle, and mechanical control means for sequencing the operations in the above order on operation of the machine by a customer.

Further objects of the invention include the specific details of construction and their cooperative arrangement to the end of providing a compact, inexpensive machine for vending one or more hot beverages such as coffee, cocoa, soups, tea, and the like.

Other objects of the invention and the specific manner in which the components of the machine function to attain these objectives will be apparent from the following description and the accompanying drawings. In the drawings, in which like numerals of reference denote like parts throughout the several views:

While the preferred form of the vending machine of the present invention is shown and described herein, it will be obvious that the machine is capable of many modifications and variations without departing from the scope of the invention, while still attaining its objectives.

Figure 1:
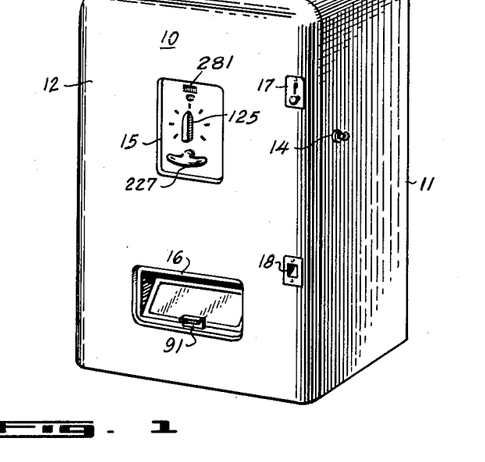
Fig. 1 is a general perspective of the beverage vending machine illustrating the location and arrangement of the operating controls and the delivery opening.
Figure 2:
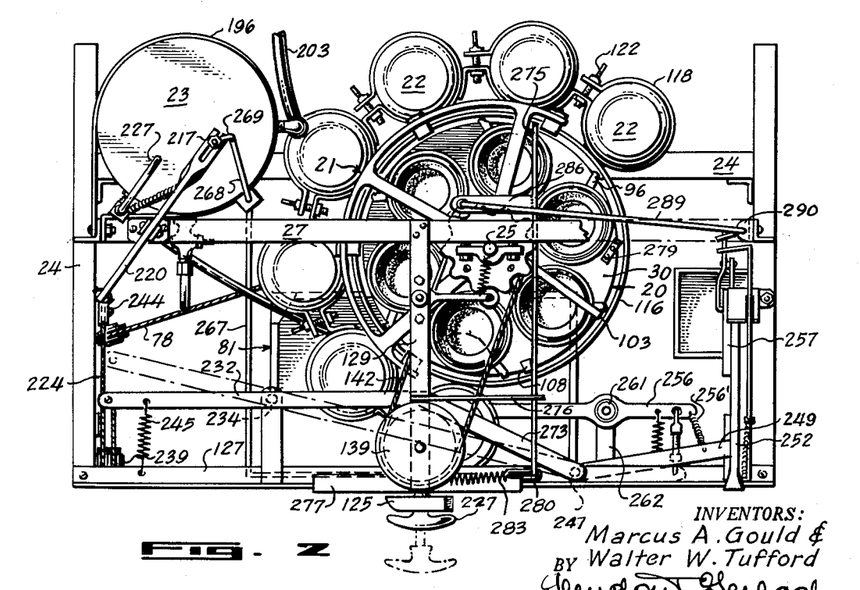
Fig. 2 is a plan view of the vending machine with the case or shroud removed to illustrate the general arrangement of the storage means for the receptacles or cups, the rack supporting the containers for the powdered ingredients, the liquid storage means, and the control system.

With particular reference to Fig. 1, the operating elements of the vending machine of the present invention are shown to be housed in a case or shroud 10 of generally rectangular shape. The vending machine is adapted for use in a variety of locations and for mounting from a wall or to be supported from a suitable floor stand. The case 10 as shown, comprises a generally rectangular rear portion 11 formed of four sides and an enclosed back, and having a front cover member 12 hinged along one side of its open forward face adapted to be locked thereto to provide a complete enclosure by means of a keyed lock 14 to prevent unauthorized access to the operating elements of the machine and to permit, when opened, maintenance of the machine and servicing of its contents.

The front cover 12 is provided with a central opening 15 through which the actuating and selecting controls of the machine are made available to the customer, a lower delivery opening 16, a coin insert opening 17, and a coin return bezel 18. It is to be particularly noted that the operating controls of the machine and the manner in which they are presented to the customer are simple and uncomplicated so that they are readily understandable without complex instructions and yet discourage malicious tampering.

Essentially the operating elements of the vending machine comprise a central rotatable receptacle storage frame 20 adapted to support a plurality of vertical stacks of nested paper cups A of the type having a rolled upper edge or lip A¹; a support rack 21 mounted for independent rotation around the receptacle storage frame 20 and adapted to support at its lower end a plurality of containers 22 containing one or more powdered ingredients B; and a storage tank 23 for a liquid C having thermostatic means for maintaining the temperature thereof at an elevated level. As will be described more fully, the operating controls of the vending machine comprise manually operable means for selectively positioning the powdered ingredient containers 22 corresponding to the desired beverage, and a single actuating means for successively (1) releasing one of the cups A to a delivery position behind the delivery opening 16, (2) discharging a predetermined amount of the selected powdered ingredient B into the released cup, and (3) discharging a predetermined volume of the heated liquid C into the cup A to admix with the powdered ingredient and form the hot beverage.

The operating elements of the machine are suitably supported with respect to one another by means of a generally box-like frame 24 formed of vertical, horizontal, and transverse structural angles and bars, adapted to fit within and form a supporting structure for the case or shroud 10. Pairs of horizontally disposed angles 24' secured to the sides of the frame 24 are adapted to cooperate with similar track members (not shown) secured to the rear portion 11 of the case 10 permitting the frame 24 to be slidably moved forward when the cover 12 is opened for maintenance and servicing of the operating elements of the machine.

The receptacle storage frame 20 and the support rack 21 are supported centrally of the frame 24 for independent rotation on a vertically disposed rod or shaft 25. The upper end of the rod 25 is secured by means of a bracket 26 approximately midway between the ends of a transverse angular frame member 27 forming an upper member of the frame 24. The lower end of the rod 25 is threaded and secured by means of nuts 28 through the flange of a lower brace member 29 forming a part of the frame 24.

The receptacle storage and releasing means contemplated in the present invention includes means for supporting a plurality of vertical nested stacks of the cups A positioned around a central axis in such a manner that all of the cups from one of the stacks are successively released to the delivery position before the cups in the next adjoining stack are used. Thus, as the cups of one stack are exhausted, the next adjoining stack of cups is automatically moved by rotation into position for the release of its cups, and this operation is continued until all of the stacks of cups in the storage frame 20 are exhausted.

Figures 8, 9, 9A, 10:
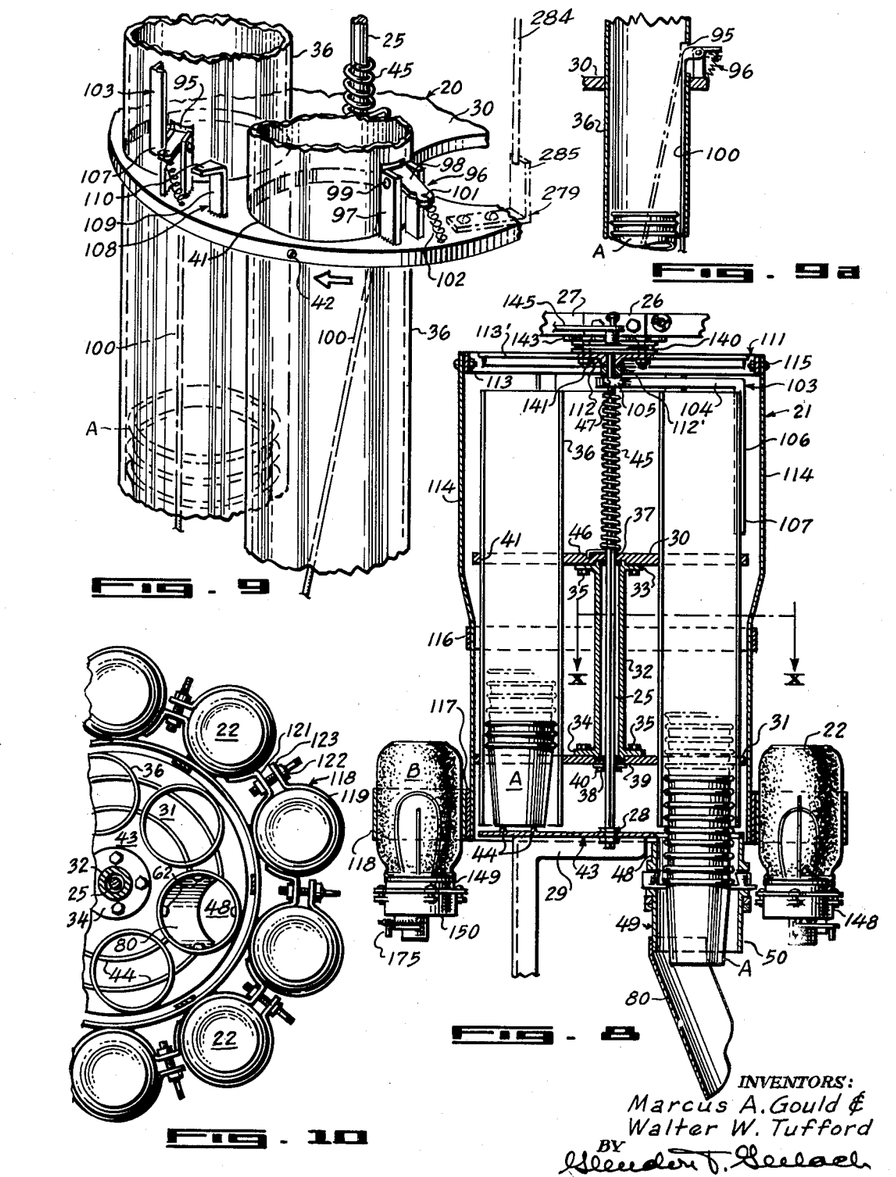
Fig. 8 is a section of the receptacle storage means and the rack for supporting the powdered ingredient containers illustrating the relationship between the cup delivery means and the powdered ingredient dispensing means.
Fig. 9 is a fragmentary perspective of a portion of the receptacle storage means.
Fig. 9a is a section of one of the support tubes of the receptacle storage means illustrating parts of the mechanism for controlling the rotation thereof.
Fig. 10 is a section of the receptacle storage means and the rack for supporting the powdered ingredient containers taken on the line X—X of Fig. 8.

Referring particularly to Figs. 8 and 9, the receptacle storage frame 20 comprises essentially upper and lower discs or circular plates 30 and 31, a hollow central support member 32 having upper and lower flanged end portions 33 and 34 adapted to be secured respectively to the opposed faces of the discs 30 and 31 by means of machine screws 35 in a plurality of vertical open ended tubes 36 which may be of metal, glass, or plastic material and which have an internal diameter providing clearance with the external diameter of the cups A.

Central holes 37 and 38 provided respectively in the upper and lower plates 30 and 31 accommodate the rod 25 and communicate with the internal bore of the support member 32, to form journals permitting rotational support of the storage frame 20 on the rod 25. The storage frame 20 is supported vertically on the rod 25 by means of a washer 39 fitting on the rod 25 adapted to bear against the lower face of the disc 31, and being itself supported on a transverse pin 40 held in a hole passing through the rod 25. The tubes 36 are supported in pairs of radially aligned holes 41 provided in the discs 30 and 31. While any number of the tubes 36 may be employed within the practical limits of the machine, six are shown spaced apart equally at 60° in the illustrated embodiment. The tubes 36 are secured against axial movement in the holes 41 by means of set screws 42 passing through tapped holes in the outer faces of the discs 30 and 31.

Secured against the upper face of the lower brace member 29 by means of the nuts 28 is a circular plate 43 having a radius which is somewhat greater than the distance from the outer faces of the tubes 36 to the center of the discs 30 and 31 and which serves to retain stacks of the nested cups A when positioned within the tubes 36. The upper face of the circular plate 43 is provided with a pair of concentric raised projections 44 located beneath the tubes 36 to reduce friction between the cups A in the tubes 36 and the plate 43 as the storage frame 20 is rotated relatively thereto.

The tubes 36 are positioned in assembly with their lower ends spaced above the plate 43 to provide clearance therewith, and the upper ends are spaced beneath the transverse brace member 27.

A helical spring 45 is adapted for assembly on the rod 25 above the upper disc 30, having its lower end secured in a hole 46 in the upper face of the disc 30, and its upper end passing through a transverse hole 47 in the rod 25. It will thus be seen that rotation of the storage frame 20 in a direction tending to tighten the spring 45 will build up a restoring force tending to rotate the storage frame 20 in the opposite direction.

Adjacent the forward portion of the present vending machine, the circular plate 43 is provided with a chamfered opening 48 having the same diameter as the inside diameter of the tubes 36 and being radially located to align with the tubes 36 as they are rotated around the rod or shaft 25, to provide a discharge opening for the cups A supported within the tubes 36.

Figures 11, 12:
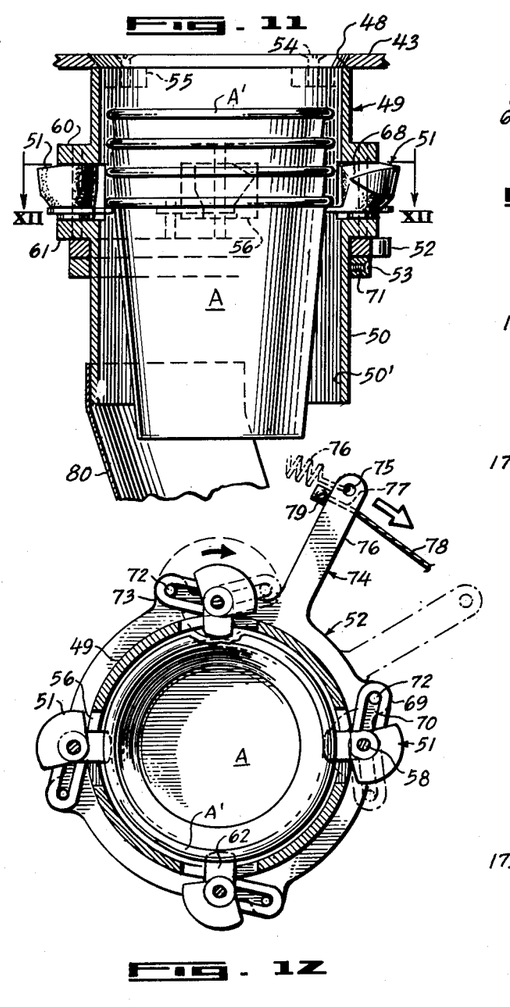
Fig. 11 is a section of the mechanism for positively and successively releasing cups from the nested stacks supported in the receptacle storage means.
Fig. 12 is a section of the cup releasing mechanism taken on line XII—XII of Fig. 11.

Mounted upon the lower face of the circular plate 43 and associated with the discharge opening 48 is a receptacle release assembly 49 comprising essentially a tubular guide chute 50 having an internal bore 50' of constant diameter equal to that of the opening 48, a series of release cams 51, an actuating ring 52, and a retainer ring 53.

The cup release assembly 49 is supported from the lower face of the plate 43 with the internal bore 50' aligned with the opening 48, by means of a series of screws 54 extending through the plate 43 into suitably tapped holes in outwardly extending lugs 55 formed on the outer surface of the guide chute 50 adjacent its upper end.

The guide chute 50 when supported in assembled relation with the plate 43 extends vertically downwards, and is provided centrally of its ends with a series of rectangular radially spaced openings 56, four being shown spaced at 90° from each other. One of the release cams 51 is pivotally mounted in association with each of the openings 56 for simultaneous actuation to support the cups A in the stack overlying the opening 48, and to positively and successively eject or release the lowest of the cups A in response to each operation of the machine.

Figure 11A:
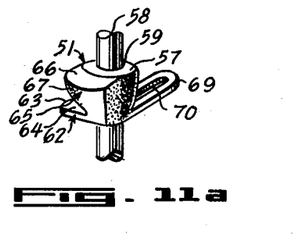
Fig. 11a is a detail of the cup releasing mechanism.

Each of the release cams 51 is provided with a central generally cylindrical body portion 57, which serves as a journal for a pivot pin 58 by means of an axial hole 59. The ends of the pivot pins 58 are adapted to be secured in suitably aligned holes in upper and lower lugs 60 and 61 projecting outwardly from the outer surface of the guide chute 50 adjacent the upper and lower edges respectively of each of the openings 56. Each of the release cams 51 is provided with an extended support arm 62 having an outer edge 63 and an upper flat engaging surface 64, formed integrally with the body portion 57 adjacent its lower edge. Rotation of the release cam 51 around the pivot pin 58 causes the support arm 62 to rotate into or out of the internal bore 50' of the guide chute 50 through the opening 56.

When all of the release cams 51 are in their normal positions, the support arms 62 are directed toward the center of the guide chute 50 and their outer edges 63 form a series of points of support for a cup A by engagement of their surfaces 64 with the lower side of the cup lip A'. When the support arms 62 are rotated away from the center of the guide chute 50, the outer edges 63 clear the cup lip A' permitting the latter to fall by gravity through the guide chute 50.

For positively separating the lower cup A from the nested stack of cups above it, and simultaneously supporting the remaining cups in the stack, each of the release cams 51 is provided with a segmental projection 65 comprising an inclined upper camming surface 66 and an inclined lower camming surface 67. The upper and lower camming surfaces 66 and 67 converge to a leading edge 68 disposed above the upper surface 64 of the support arm 62 and displaced angularly behind the trailing edge of the latter with respect to its path of rotation. The height of the leading edge 68 above the upper surface 64 and the amount of its angular displacement is such that when all of the release cams 51 are rotated from their normal positions wherein the lowest cup A within the guide chute 50 is supported by its lip A', the lower surface of the cup lip A' of the next succeeding cup higher is engaged by the upper camming surfaces 66. To overcome any resistance of the lowest of the stacked cups A to separate from the next higher cup, the lower camming surfaces 67 are adapted to engage the upper surface of the lip A' of the cup being released, thus positively forcing its separation and movement downwards for delivery through the lower end of the guide chute 50. As thus described, when the release cams 51 are simultaneously rotated from their normal positions, the lowest of the cups A within the guide chute 50 is released from the support of the arms 62 and is positively ejected by the action of the lower camming surfaces 67, and the remainder of the stack of nested cups A above the cup release mechanism 49 is supported by engagement of the upper camming surfaces 66 with the cup lip A' of the next higher cup. When the cams 51 are again rotated to their normal positions, the upper camming surfaces 66 are withdrawn or rotated out of engagement with the lower side of the cup lip A', and the stack of cups A drops until the lowest cup is again supported on the upper surfaces 64 of the support arms 62 in position for a repetition of the operation.

Each of the release cams 51 is provided with an extended operating arm 69 having a radial slot 70. The actuating ring 52 is rotatably supported on the exterior surface of the guide chute 50 below the lugs 61 and is secured in spaced axial relation thereto by means of the retainer ring 53 which encircles the guide chute 50 and is detachably mounted thereon by means of a series of radially located set screws 71.

The actuating ring 52 is provided with a series of radially spaced vertical actuating pins 72 supported by their lower ends in suitable holes in external lugs 73, one of the pins 72 being provided for each of the release cams 51 and being correspondingly spaced around the outer periphery thereof. Each of the actuating pins 72 is adapted to fit on assembly into the slot 70 of one of the release cams 51 and to cause rotation of the latter when the actuating ring 52 is rotated with respect to the guide chute 50. The actuating ring 52 is provided with a radial actuating arm or lever 74 having a hole 75 in its outer end for attachment of the end of a tension spring 76, which, in turn, has its other end secured to an adjacent portion of the frame 24 of the vending machine in such a manner as to bias the actuating ring 52 in a counterclockwise direction as viewed in Fig. 12, or so that the release cams 51 are all held in their normal positions wherein the support arms 62 are disposed towards the center of the guide chute 50. The outer end of the actuating lever 74 is also provided with a transverse hole 77 adapted to accommodate the end of a cup releasing actuating cable 78 which is secured therein by means of a locking collar 79.

One of the features of the cup release mechanism 49 resides in the arrangement of the release cams 51 and the actuating ring 52, whereby a relatively small angular movement of the latter results in substantially 180° angular movement of the cams 51 to effect quick and positive releasing action.

Movement of the cup releasing actuating cable 78 results in the simultaneous rotation of all of the release cams 51 from their normal position against the force of the spring 76, and the ejection of the lowest of the cups A within the guide chute 50 as heretofore described. A directional shield or chute 80 is attached as by soldering or welding to the lower end of the guide chute 50 for the purpose of guiding the cups A as they are released from the receptacle release assembly 49 to the delivery position.

Figure 3:
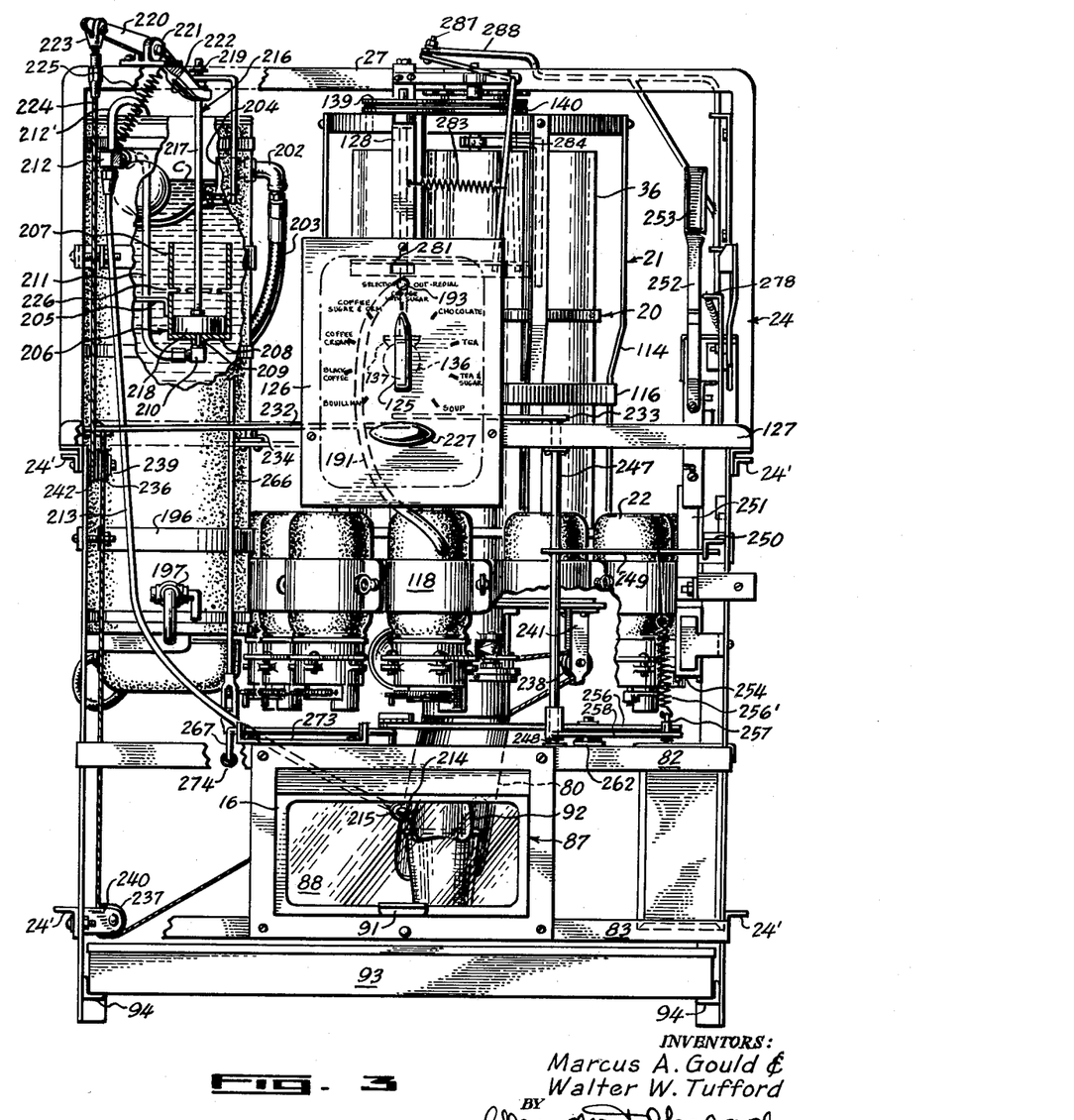
Fig. 3 is a front elevation of the machine with the case removed including a broken or fragmentary view of certain portions of the liquid storage means to illustrate the mechanism for metering and controlling the liquid delivery.
Figures 4, 6, 7:
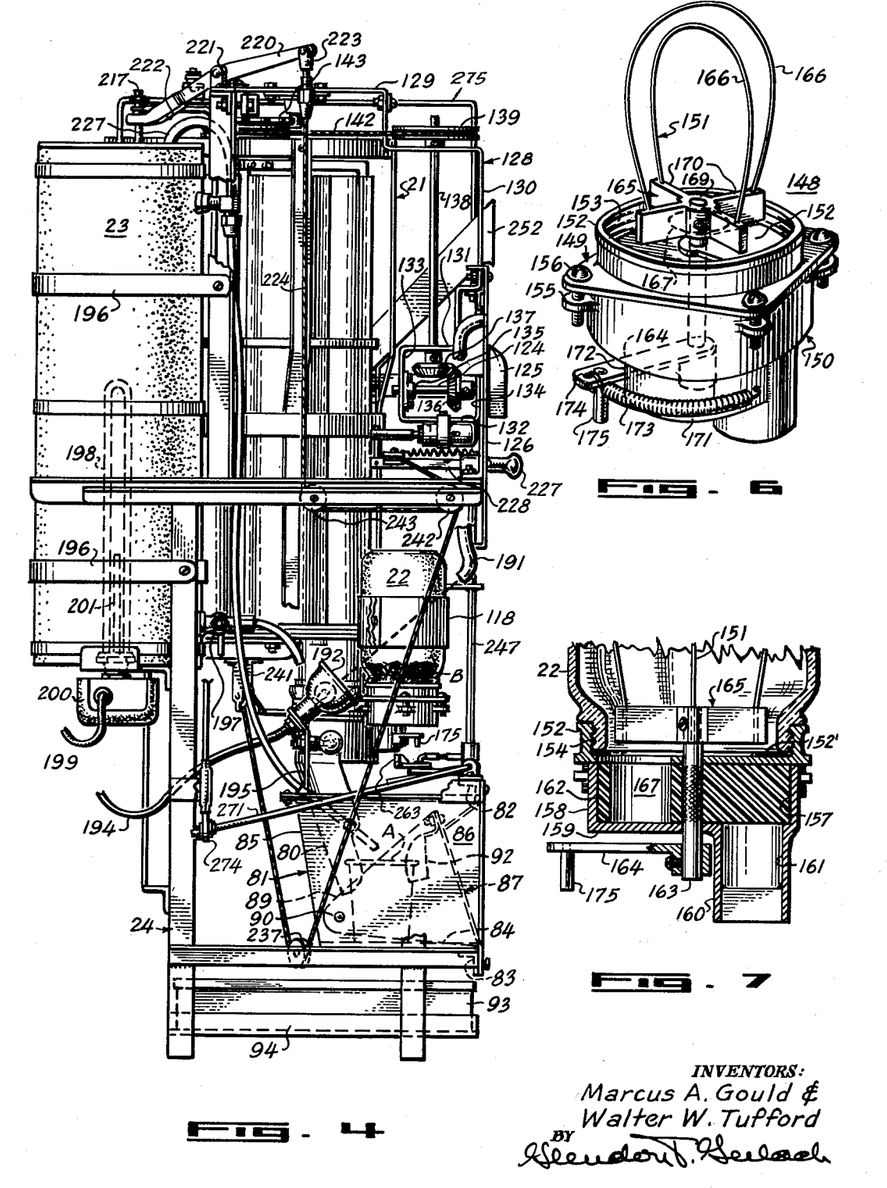
Fig. 4 is a side elevation of Fig. 3.
Fig. 6 is a perspective of a preferred form of the mechanism for agitating and dispensing the powdered ingredients.
Fig. 7 is a partially offset cross-section of the mechanism for dispensing the powdered ingredients illustrating the means for maintaining the contents of the powdered ingredient containers in a sealed condition.

To support the released cup A in the delivery position preparatory to the injection of the powdered ingredient B and the liquid C, the vending machine is provided with a delivery frame 81 comprising essentially a generally open topped box-like structure supported between a pair of transverse frame members 82 and 83, having a floor portion 84, a back portion 85, and a pair of side members 86. The open forward side of the frame 81 is located on the frame 24 in such a manner as to coincide with the delivery opening 16 of the shroud 10 when the vending machine is in operating condition. Except when the customer is withdrawing the prepared beverage from the machine, the open front of the frame 81 and the delivery opening 16 are closed by means of a pivoted cover plate comprising a vertically rotatable frame 87 having a transparent frontwindow portion 88. Projecting side members 89 of the frame 87 are pivoted at their rear extremities 90 to the side members 86 of the delivery frame 81 in such a manner that raising the cover plate by means of a handle 91 adjacent the lower edge of the window portion 88 gives access to the delivery frame 81 and permits a customer to withdraw a cup A disposed therein. When the pivoted frame 87 is in its lowered or closed position, a curved shield or guide member 92 supported adjacent the upper edge of the window portion 88 cooperates with the lower end of the directional chute 80 to positively locate and position a cup A released from the cup release mechanism 49 into the delivery position of the machine on the floor portion 84 of the delivery frame 81. The central portion of the latter element upon which the released cup A is adapted to be supported may be perforated for drainage purposes, and a removable drip pan 93 is provided supported beneath the floor portion 84 upon suitably located cross-members 94 of the frame 24. When the rotatable frame 87 is raised to give access to the delivery frame 81, the curved shield 92 extends over the lower end of the guide chute 80 acting as a closure therefor.

With respect to the storage of the cups A within the vending machine of the present invention, it is contemplated that the latter be prepared for operation by filling each of the tubes 36 of the receptacle storage frame 20 with stacks of the cups A in nested disposition, and means are provided in association with the storage frame 20 for automatically indexing the latter as the stacks of cups A are successively exhausted by their release through the receptacle release mechanism 49. One of the principal features of this vending machine resides in this arrangement as it permits the storage of a large supply of the cups A in a relatively small and compact manner and requires no substantial effort on the part of the customer to effect its operation.

To provide for the automatic indexing of the receptacle storage frame 20 in order to successively position the tubes 36 over the opening 48 and the receptacle release mechanism 49, each of the tubes 36 is provided with an axial rectangular slot 95 spaced above the upper surface of the disc 30 when the tube 36 is in its assembled position, which accommodates an associated latch member 96 pivotally supported from the upper surface of the disc 30 by means of a pair of upstanding bracket members 97. With particular reference to Figs. 9 and 9a, each of the latch members 96 comprises a horizontally disposed generally flat portion 98, transversely pivoted for vertical rotation adjacent the slot 95 between the brackets 97 by means of a pin 99, and having secured to its inner end a rod or wire 100 which is adapted on assembly to extend within the tube 36 and towards the lower end thereof in a generally vertical plane. The outer end of the flat portion 98 is provided with a hole 101 adapted to support one end of a tension spring 102, the lower end of which is secured as by a screw to the upper surface of the disc 30 in such a manner that the spring 102 is disposed in a substantially vertical position and biases the latch member 96 with its flat portion 98 urged downwardly. In this condition, the lower end of the rod 100 is caused to be rotated against and limited by the inner surface of the tube 36 diametrically opposite the slot 95. It will be seen that when the tube 36 is filled with a nest of the stacked cups A, the outer surfaces of the latter will bear against the rod 100, rotating the flat portion 98 of the latch member 96 to its raised position. The length of the rod 100 is so selected that its lower end is released from contact with cups A within the tube 36 when the uppermost of the cups in the stack falls below the lower end of the tube 36 and is positioned within the receptacle release mechanism 49, thus allowing the rod 100 to rotate until it contacts the inner opposite surface of the tube 36, and the flat portion 98 of the latch member 97 to depress under influence of the spring 102.

A stop lever or arm 103 for controlling the movement of the receptacle storage frame 20 is provided, consisting of a horizontal portion 104 having its inner end adapted to be secured to the stationary rod 25 by means of a clamp 105, and an outer vertical portion 106 depending therefrom beyond the outer surfaces of the tubes 36, and having its lower end 107 disposed in the radial path of the outer ends of the latch members 96. The lower end 107 of the stop lever 103 is of such length that it engages the latch members 96 when the flat portions 98 of the latter are in their elevated or raised positions, and clears them when the latter are depressed.

A limit bracket 108 comprising a vertical portion 109 having its lower end welded to the upper face of the disc 30 adjacent the outer edge of the latter, and having an outwardly disposed projecting lug 110 is provided for limiting the rotation of the receptacle storage frame 20 to a single revolution of the latter in the loading and unloading operations. For this purpose, the lug 110 is disposed in such a manner that it engages the lower end 107 of the stop lever 103 when the receptacle storage frame 20 is rotated.

In the unloaded condition of the storage frame 20, the spring 45 is assembled in a partially tightened condition, so that the receptacle storage frame 20 is biased to rotate but is limited against movement by engagement of the stop lever 103 against one side of the limit bracket 108. All of the latch members 96 are in their depressed positions, clearing the lower end of the stop lever 103. The receptacle storage frame is then rotated a complete revolution until the other side of the limit bracket 108 engages the stop lever 103, further tightening the spring 45. A stack of nested cups A is then introduced into the tube 36 adjacent the limit bracket 108, which raises its associated latch member 96 providing a lock against rotation of the frame 20 in a direction tending to unwind the spring 45. The remaining tubes 36 may then be similarly loaded with stacks of nested cups, through their open upper ends.

The stop lever 103 is angularly disposed with respect to the rod 25 in such a manner as to engage the latch member 96 of the tube 36 located over and aligned with the openings 48 and the receptacle release mechanism 49. Thus, when the stack of cups A in this particular tube 36 are exhausted by successive operations of the vending machine, its respective latch member 96 is released to its depressed position, clearing the end of the stop arm 103 and permitting the storage frame 20 to rotate under influence of the spring 45 until the stop arm 103 engages the latch member 96 of the next tube in which a stack of the cups A has been disposed, thus bringing another stack of the cups A into position for further vending operations. The operation is thus automatically continued until all of the cups in all of the tubes 36 are exhausted, in which condition, the stop arm 103 is again in engagement with the limit bracket 108 preventing further rotation of the receptacle storage frame 20 until the supply of the cups A has been replenished.

While the machine contemplated by the present invention may be employed for vending a single type of beverage, as, for example, coffee, it is also adapted for vending a variety of beverages such as coffee with cream, coffee with sugar and cream, chocolate, or soup. In any case, it is intended that each of the beverages be formed by the infusion of the liquid C which is preferably hot water, with a beverage forming ingredient B. It is essential that the ingredient B be free-flowing in order to insure accuracy in the amounts dispensed and positive dispensing without complex vibrators or the like, and to which end it is preferred that they be in agglomerated or granular form. It is well known that solid ingredients of this form are adversely effected by moisture absorption and aging during periods of storage and a primary feature of the present machine is to provide means whereby the beverage forming ingredients may be readily replenished, a variety of different powdered ingredients utilized, and wherein they are maintained in a sealed condition during storage in the machine prior to their use. To this end, it is contemplated that the powdered or granulated ingredients B employed in the present machine are vacuum-packed at their place of origin in screw-top type jars or containers 22 and that they are dispensed within the machine from the original containers.

It is intended that a plurality of the containers 22 filled with the desired variety of ingredients B, be supported in the vending machine on the support rack 21 and that the rack be rotatable under the control of the customer to position a container 22 at the delivery position of the machine having an ingredient B corresponding to the type of beverage desired and selected by the customer.

Figures 5, 14:
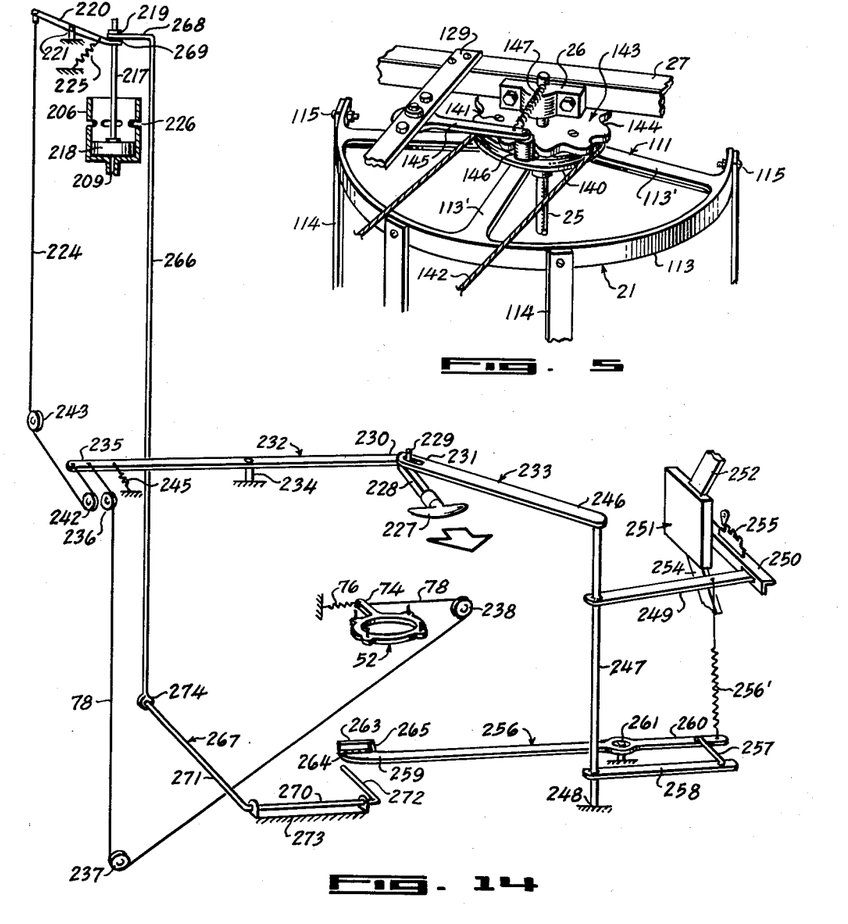
Fig. 5 is an enlarged detail of the upper bearing means for supporting the receptacle storage means, and the rack for supporting the powdered ingredient containers.
Fig. 14 is a schematic view showing the elements of the system for actuating the various components of the vending machine to effect automatic and positive sequencing and delivery of the desired beverage.

As illustrated in Figs. 5 and 8, the support rack 21 comprises an arcuate spider 111 having a central boss 112 drilled to accommodate the rod 25 to permit the rack 21 to freely rotate thereon and having an outer rim portion 113, supported from said central boss 112 by a plurality of integral radial arms 113', a series of vertical spaced bars 114 secured at their upper ends to the rim 113 by means of bolts 115, an intermediate circular support hoop 116 welded or otherwise secured to the bars 114 intermediate of their ends to hold them in spaced relation to one another, a lower circular support hoop 117 welded or otherwise secured to the lower ends of the bars 114, and a series of container clamp means 118 secured to the outer surface of the lower support hoop 117 in radially spaced relation as a means of positioning and supporting a plurality of the containers 22. The frame or rack 21 thus provided encircles and is coaxial with the receptacle storage frame 20, and is mounted for independent rotation with respect thereto on the stationary rod or shaft 25.

The arcuate spider 111 is somewhat less than 180° in length, and is supported vertically on the shaft 25 by means of a bearing collar 112' which is brazed or otherwise secured thereto.

The clamp means 118 comprises a series of bands or sheet metal straps formed into a circular portion 119 approximating the external diameter of the containers 22. The inner surface of the circular portion 119 is welded to the external surface of the lower support hoop 117. One end of each strap is bent away from the support hoop 117 to form a bearing 121 for a clamping bolt 122 and is additionally welded to the next adjoining circular clamp portion 119. The other or free end 123 of the strap forms a return bend to cooperate with the bent-away portion 121 and the clamping bolt 122 as a means for removably securing one of the containers 22 to the lower portion of the support rack 21. While the number of containers 22 that may be accommodated by the machine of the present invention depends upon the circumference of the support rack 21 and of the containers, in the present instance, provision is illustrated for accommodating seven containers spaced equally around the portion of the lower support hoop 117 corresponding to the arcuate length of the spider 111 and adapted to have their contents dispensed by gravity into the cups A when selectively positioned above the delivery position.

Referring particularly to Figs. 4 and 5, rotation of the support rack 21 and the containers 22 for selective control by the customer is provided by means of a control shaft 124 having a manually-operable and rotatable selector handle 125 made available to the customer through the opening 15 in the shroud 10 when the machine is closed and in readiness for operation. The forward end of the control shaft 124 is journalled in and extends through a central opening in a control plate 126 which is aligned with the opening 15 of the shroud 10. The control plate 126 is supported adjacent its lower edge on a transverse frame member 127 suitably secured at its ends across the front of the frame 24. A central frame member 128 is provided for additional support for the control plate 126 secured at its upper end centrally of the transverse frame member 27, and having a generally horizontal forwardly extending portion 129 and a depending vertical end portion 130. At its lower extremity, the frame member 128 comprises a pair of horizontal portions 131 and 132, joined by a vertical portion 133, and terminates in a bent-up vertical portion 134, the latter having a hole forming a forward bearing for the control shaft 124. A bearing block 135 is bolted to the vertical portion 133 as a journal for the rear end of the control shaft 124.

A bevel gear 136 is secured for rotation on the control shaft 124 and is adapted to engage a mating bevel gear 137 which is secured to the lower end of a vertical shaft 138. The shaft 138 is rotatably supported adjacent its ends in suitable holes in the horizontal portions 129 and 131 in the frame member 128, and a pulley 139 is secured to its upper end above the latter. A mating pulley 140 having a central hole accommodating the shaft 25 is secured to the arms 113' of the spider 111 by means of bolts or screws and is adapted to be rotated by the pulley 139 by means of an interconnecting cable 142. Above the pulley 140 on the shaft 25 and secured to the latter by means of bolts 141 is an index plate 143, the outer edge of which is formed as a series of curved projections and depressions forming a continuous but notched camming surface 144, the depressed portions being spaced to conform angularly to the spacing of the containers 22 on the support frame 21. A lever 145 is pivoted at one end to the horizontal portion 129 of the frame member 128 and is provided with a roller 146 rotatably supported on its outer end adapted to engage the camming surface 144 of the index plate 143 and to bear against the same under the influence of a tension spring 147 attached to the lever 145 adjacent its free end and to the transverse frame member 27.

As thus described, it will be seen that rotation of the handle 125 results in rotation of the support rack 21 and the containers 22 mounted thereon, through rotation of the control shaft 124, the bevel gears 136 and 137, and the pulleys 139 and 140, and that the action of the roller bearing lever 145 against the index plate 143 positively positions the support rack 21 in one of as many positions as are provided for the containers 22. Movement of the selector handle 125 is limited to somewhat less than one revolution, and the elements controlling rotation of the storage frame 21 are proportioned and assembled so that any of the containers 22 supported thereon may be disposed over the delivery position of the machine within that range of movement. The forward face of the control plate 126 is preferably provided with indicia around the control shaft 124 adjacent the end of the handle 125 describing the nature of the beverages provided by the machine. Thus, when a customer selects the desired beverage by turning the handle 125, one of the containers 22 having contents that correspond to the selection, is positively located and positioned in the vending machine over the delivery position for discharge into a released cup A.

Referring particularly to Figs. 6 and 7, the present invention contemplates the use of a dispensing assembly 148 associated with each of the containers 22 and adapted to be supported thereon to provide a positive seal for the container while positioned in the vending machine and having means for dispensing a predetermined amount of the contents thereof in response to operation of the machine by the customer.

Each of the dispensing assemblies comprises an upper plate 149, a housing portion 150, and a rotatable dispensing and agitating mechanism 151. The upper plate 149 is generally rectangular and is provided with a circular raised flanged portion 152 having an internal thread 153 adapted to engage a corresponding externally threaded portion 154 on each of the containers 22 in order to support the dispensing assembly from the container 22 and to form therewith a positive seal. The housing portion 150 is generally cylindrical and is formed with a plurality of spaced laterally projecting lugs 155 adjacent its upper face which are provided with suitably tapped holes for cooperation with machine screws 156 adapted to extend through corresponding holes in the upper plate 149 for securing the two parts together in assembled relation. The housing portion 150 is provided with a cylindrical bore 157 defining a circular wall portion 158 and a closed bottom wall portion 159. A discharge chute or spout 160 extends downwardly from the bottom wall portion 159 adjacent the periphery of the latter having a central circular-sectioned opening 161 communicating with the bore 157 at its upper end. The upper plate 149 is relieved within the flanged portion 152 to define a segmental partition 152' extending from the center outwardly to provide a closure over the discharge chute 160 of the housing portion 150 when assembled with the plate 149.

The dispensing and agitating mechanism 151 comprises a plate or disc 162 adapted to fit within the bore 157 between the wall portion 159 of the housing 150 and the lower face of the plate 149 and having a central actuating shaft 163 adapted for rotatable support in aligned holes in the wall portion 159 and the partition 152', a lever arm 164, adapted to be secured to the lower end of the shaft 163, and a spider 165 secured by a set screw to the upper end of the shaft 163 adapted to support a pair of looped wire agitator elements 166. An axial hole or cavity 167 is provided extending through the disc 162 of the same diameter as the opening 161 of the discharge chute 160 and radially positioned in such a manner that the cavity 167 aligns with the opening 161 on rotation of the disc 162.

The disc 162 is preferably formed of a moulded plastic composition and the shaft 163 may be integrally moulded therein. The spider 165 comprises a central body portion 169 forming a support for engagement with the upper end of the shaft 163 having two pairs of outwardly extending 180° spaced arms 170 of such radius as to clear the open threaded end 154 of the container 22. Holes are provided in the upper surfaces of the arms 170 adjacent their outer extremities in which the ends of the wire agitator elements 166 are secured as by soldering. The agitator elements 166 are formed of resilient wire and are of such length that when the dispensing assembly 148 is mounted on the threaded end 154 of the container 22, they extend into the latter for approximately its full depth, and serve to agitate the contents thereof on rotation of the disc 162 by means of the arm 164.

The lower surface of the housing 150 is provided with a downwardly extending arcuate guide member 171 having one end welded or otherwise secured to the outer surface of the discharge spout 160 and the other end 172 acting as a stop for restricting the movement of the lever arm 164. A tension spring 173 is secured at one end to the guide member 171 adjacent the discharge spout 160, and its other end is adapted to be secured in a hole 174 in the outer end of the lever 164 biasing the latter against the end 172 of the guide member 171. A downwardly extending actuating pin 175 is secured to the outer end of the lever 164 having its upper end fastened thereto by brazing or the like. In the normal position of the dispensing assembly 148, the lever 164 is so positioned on the shaft 163, that the cavity 167 communicates with the container 22 when the lever is in engagement against the edge 172 of the guide member 171. In this position, the cavity 167 is filled by gravity with an amount of the powdered ingredient B with which the container 22 is filled equal to its volume. On rotation of the disc 162 by means of the lever 164 until the cavity 167 aligns with the opening 161, the powdered ingredient B in the cavity 167 is discharged by gravity through the discharge spout 160, the upper end of the cavity 167 being closed by the partition 152'. Thus it will be seen that upon each actuation of the dispensing assembly 148, a predetermined amount of the powdered ingredient B within the container 22 will be discharged equal in volume to that of the cavity 167. The amount of material from the container 22 discharged may be varied by providing the disc 162 with a cavity of smaller diameter, or by reducing the height of the disc 167 and the wall portion 158.

Figure 13:
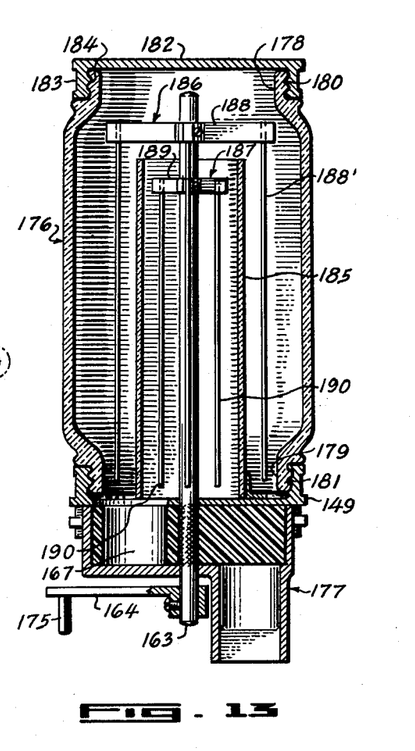
Fig. 13 is a cross-section of a special form of container and dispensing mechanism adapted for use in the vending machine where it is desired to utilize two different powdered ingredients in forming a single beverage.

It has been found inadvisable to admix certain powdered ingredients for beverage making purposes prior to their use. For example, the admixture of powdered coffee with milk or cream in powdered form in a single container prior to the use of the mixture to form a beverage by the addition of hot water may result in the formation of an unattractive film of vegetable oils on the surface of the mixed beverage. In these instances, the present invention contemplates a special form of the container 22 and dispensing mechanism 148 which is shown in Fig. 13. In this modification two ingredients may be stored for simultaneous dispensing from the same discharging mechanism, but are kept separated from each other within the container until their use is required.

The assembly shown and illustrated in Fig. 13 comprises a container 176 and a dispensing assembly 177. The container 176 is preferably of generally cylindrical form and is provided with open ends 178 and 179 having external threads 180 and 181 respectively. The assembly includes a closure cap 182 having a depending flanged portion 183 provided with an internal thread 184 adapted to engage the upper end 178 to form a sealed upper closure for the container 176. The elements forming the lower parts of the dispensing assembly 177 are identical in form and function with those of the dispensing assembly 148 as shown in Figs. 6 and 7 and described in connection therewith. In the modification of Fig. 13, however, the upper plate 149 additionally supports a central open-ended vertical tube 185 to which it is attached by brazing or welding. The diameter of the tube 185 is such that its lower edge overlies the cavity 167 in the disc 162 and forms a partition therewith, in such a manner that the respective areas of the cavity 167 lying outside and inside of the tube 185 are in proportion to the desired amounts of the two ingredients intended to be dispensed. In this modification, the central shaft 163 is adapted to extend upwards to a position adjacent the upper sealed end of the container 176 when the dispensing assembly 177 is secured thereto by engagement of the threaded end 179 of the container with the threaded flange portion 152 of the upper plate 149. The shaft 163 is adapted to support a pair of spiders 186 and 187 adjacent its upper end. The upper spider 186 is secured to the shaft 163 by a set screw and is provided with a plurality of radially projecting arms 188, each forming a support at its outer end for a depending agitator wire 188', disposed externally of the tube 185 and extending substantially to the lower end 179 of the container 176. The inner spider 187 is similarly secured to the upper end of the shaft 163 below the spider 186 by means of a set screw, and is provided with a plurality of radial arms 189 whose radii are less than that of the tube 185 so that the spider 187 lies within the same. A depending agitating wire 190 is supported at its upper end from each of the arms 189 within the tube 184 and extends downwardly to clear the upper surface of the plate 149.

In the use of the container 22 and dispensing assembly 148 described in connection with Figs. 6 and 7, it is contemplated that the containers 22 be packed with fresh powdered ingredient B at source, and that for shipping purposes the upper threaded end 154 thereof be sealed by means of a suitable disposable cap (not shown). By this means, the powdered ingredients may be hermetically sealed at their source and kept indefinitely until their use is desired in connection with the vending machine of the present invention. At that time, the disposable cap portion is replaced with one of the dispensing assemblies 148 and the assembly is mounted in the vending machine in the desired radial position on the storage rack 21 by means of the clamping means 118 with the spout 160 disposed downwardly. The modified container 176 of Fig. 13 is intended to be used as a part of the vending machine, and not as a primary means of storing and shipping the ingredients B. In its use, where two incompatible ingredients are desired as above explained, the assembly of the container 176 and dispensing assembly 177 is supported in the position illustrated and the cap 182 removed. One of the ingredients is then introduced into the portion of the container 176 surrounding the tube 185, and the latter is then filled with the second ingredient. The cap 182 is replaced and the assembly is then ready for installation in the machine. Since a supply of both of the ingredients within the container 176 is maintained, the cavity 167 is filled with the proper amounts of both which are discharged through the discharge spout 160 when the actuating lever 164 is rotated.

The vending machine is provided with means for indicating to the customer when the contents of a selected container 22 are exhausted comprising a Lucite indicating rod 191 and a shielded electric light assembly 192. The rod 191 is supported within the frame 24 by means of suitable brackets (not shown) and is so formed that its upper end is positioned behind an opening 193 in the control plate 126, while its lower end is supported adjacent the upper end of a container 22 located in the dispensing position. The light assembly 192 is adapted for connection to an electric power source by a wire 194 and is secured to the delivery frame 81 by means of a bracket 195. The light assembly 192 is positioned in such a manner that when energized, it directs a beam of light through the lower portion of a container 22 in the dispensing position and against the lower end of the Lucite rod 191. When the container 22 is filled or partially filled with the ingredient B, its contents prevent transmission of light from the light assembly 192 to the lower end of the rod 191, but when exhausted, light is transmitted through the rod 191 illuminating the upper end thereof to indicate to the customer that the selected container 22 is empty. Suitable indicia are provided on the control plate 126 adjacent to the opening 193 to inform the customer that the selected container 22 is empty when the upper end of the rod 191 is illuminated.

The vending machine of the present invention includes means for storing a liquid C and maintaining it at a desired elevated temperature, and means for positively introducing a predetermined volume of the heated liquid into the cups A as they are successively ejected from the cup release assembly 49 to the delivery position on the delivery frame 81.

Referring particularly to Figs. 3 and 4 the tank 23 for storing the liquid C, is supported in the rear of the vending machine by means of a pair of circular straps 196 adapted to encircle the tank 23 and be bolted to suitable vertical members of the frame 24. The tank 23 is preferably lagged or insulated with asbestos or similar material, and is provided with a drain valve 197 adjacent its bottom portion. An electric immersion type heater 198 is mounted vertically through the bottom wall of the tank 23, adapted to be energized from a source of electric supply through a conductor 199. Associated with the immersion heater 198 and electrically interconnected to control its operation, is a thermostatic switch 200 having its sensing element 201 supported within the tank 23, so as to control the operation of the heater 198 in response to the temperature of the liquid C. The heater 198 and thermostatic switch 200 represent means for maintaining the liquid C within the tank 23 at a predetermined and elevated temperature.

The tank 23 is provided with an intake fitting 202 adjacent its upper end, adapted for connection by means of a flexible conduit 203 to a water supply line. The water level within the tank 23 is maintained constant by means of a float-controlled valve 204 associated with the intake fitting 202. Supported within the tank 23 by means of a bracket 205, is a metering cylinder 206 having an open end portion 207 disposed somewhat below the water level of the tank 23 and a closed lower end portion 208. An opening 209 is provided through the end portion 208 communicating with a fitting 210 and through a pipe 211 to a fitting 212 mounted through the side wall of the tank 23. A supply pipe 213 is attached at its upper end to the fitting 212, and leads downwardly, its lower open end 214 being supported in a lug 215 formed on one lateral edge of the directional chute 80 in order to introduce liquid C from the tank 23 into a cup A when the latter is supported on the delivery frame 81.

It is advisable that the open end 214 of the pipe 213 be positioned in such a manner as to discharge the liquid C in a tangential direction against the inner edge of the lip of the cup A in order to facilitate mixing of the liquid C with the powdered ingredient B, and to accelerate the solution of the latter to insure a thoroughly mixed beverage when presented to the customer.

The amount of the liquid C discharged through the pipe 213 to the released cup A is controlled by the action of a plunger 216 cooperating with the metering cylinder 206. The plunger 216 comprises a vertically disposed rod 217 having secured to its lower end a weighted piston 218 adapted to fit within the metering cylinder 206 for reciprocal movement therein. The rod 217 is adapted to extend above the upper end of the tank 23 and its upper end is threaded to accommodate a nut 219.

An actuating arm 220 is pivotally supported adjacent its center in a bearing block 221 bolted to the transverse frame member 27 in such manner that its inner end is disposed above the plunger 216 and accommodate the rod 217 of the latter in a slot 222. The outer end of the actuating arm 220 extends beyond the side wall of the tank 23 and is transversely drilled to receive the pin of a clevis 223, which serves as an attachment for a control cable 224. The actuating arm 220 is normally urged into a position in which the slotted inner end is depressed by means of a tension spring 225 attached to the arm 220 adjacent the slot 222 and to a suitable portion of the tank structure 23.

Referring particularly to Fig. 3, the metering cylinder 206 is provided approximately midway of its ends with a series of peripheral openings or slots 226. It will be seen that when the tank 23 is normally filled with the liquid C, the cylinder 206 is similarly filled. When the plunger 216 is raised so that the piston 218 is positioned above the slots 226, the lower portion of the cylinder 206 is filled with liquid through the slots 226. The volume of liquid within the cylinder 206 between the closed lower end portion 208 and the lower edges of the radial slots 226 is equal to the volume of liquid C desired to be introduced into each of the released cups A for forming the beverage. Thus, when the plunger 216 is raised so that the piston 218 is positioned above the slots 226 and then released, as the piston 218 passes the slots 226 in its downward travel, the slots 226 are closed and the remaining liquid beneath the piston 218 and within the cylinder 206 is forced through the pipes 211 and 213 for introduction into a cup positioned on the delivery frame 81. To prevent air lock and insure positive discharge of the liquid through the pipe 213, a vent pipe 212' is provided communicating with the fitting 212 and the upper end of the tank 23.

The metering cylinder 206 and the plunger 216 characterize means for positively discharging a predetermined volume of the liquid C into the cups A for forming the vended beverage. It will be noted that insofar as the metering system for the liquid C does not require the use of valves or the like, it requires a minimum amount of maintenance and cannot cause overflow or fail to operate.

As thus far described, it will be apparent that actuation of the contemplated vending machine essentially requires the operation of three systems—(1) the cup release mechanism 49 through rotation of the lever 74 by means of the cable 78; (2) release of the powdered ingredient B into the cup A by means of the dispensing assembly 148 through rotation of the lever arm 164, and (3) release of the liquid C from the tank 23 into the cup A by actuation of the control cable 224; and these operations are performed in that sequence by the single actuation of a control handle 227 supported centrally of the control plate 126 below the selector handle 125 as will be hereafter described. With particular reference to the schematic diagram of the control system comprising Fig. 14, the control handle 227 is secured to the forward end of a control shaft 228 which is supported in the control plate 126 for reciprocal fore-and-aft movement and had an inoperative position wherein it is retracted towards the rear of the machine, and an operative position wherein it has been pulled forward by the customer.

A vertical pin 229 is secured at its lower end to the rear end of the control shaft 228 and is adapted to engage the slotted ends 230 and 231 of a pair of horizontal levers 232 and 233 respectively. The lever 232 is pivoted at 234 to the transverse frame member 127 for swinging movement in a horizontal plane and at its outer end 235 are secured the ends of the cup release actuating cable 78 and the liquid release cable 224.

The cable 78 is guided and supported on a series of three pulleys 236, 237, and 238 which are mounted respectively on pulley brackets 239, 240, and 241 secured to suitably located elements of the frame 24 in such manner that rearward movement of the outer end 235 of the lever 232 results in clockwise rotation of the actuating ring 52 against the tension of the spring 76 to release one of the cups A through the cup release mechanism 49.

The cable 224 is supported and guided by a pulley 242 on the pulley bracket 239, and a pulley 243 mounted on a pulley bracket 244 secured on a transverse member of the frame 24, in such manner that rearward movement of the end 235 of the lever 232 results in downward movement of the outer end of the actuating arm 220 against the tension of the spring 225 to raise the plunger 217 in the metering cylinder 206.

The lever arm 232 is normally biased into its inoperative position in which the end 230 and the control handle 227 are held in their most rearward position by means of a tension spring 245 supported between the outer end 235 and the transverse frame member 127.

The forward end 246 of the lever 233 is secured to the upper end of a vertically disposed rod or shaft 247 which is rotatably supported in the frame member 127 and in a lower bearing block 248 supported on the transverse frame member 82. One end of a lever 249 is secured as by welding to the shaft 247 for rotation in a horizontal plane and extends to the right of the vending machine as illustrated with its outer and free end disposed in a slot provided in a locking bar 250. The locking bar 250 is supported for fore-and-aft movement in suitable brackets secured to elements of the frame 24 and is adapted to be releasably controlled by means of a conventional coin release mechanism 251 as indicated diagrammatically in Fig. 14. The coin release mechanism 251 is operable by coins which are guided thereto through a coin chute 252 having an open upper end 253 associated with and disposed to cooperate with the coin insert opening 17. The coin release mechanism 251 is also conventionally provided with a coin return chute 254 cooperating with the coin return bezel 18 for the return of faulty coins or in the event the machine is inoperative for any reason. The locking bar 250 is provided with conventional latch means 255 to prevent partial actuation of the controls of the vending machine, as well understood in the art and which in itself does not form an essential part of the present invention.

The arrangement of controls for actuating the powdered ingredient dispensing assembly 148 by movement of the associated lever arm 164 comprises a lever 256, a link 257, and a lever 258. The lever 258 is supported for horizontal swinging movement on the vertical shaft 247 and has one of its ends secured thereto as by welding, being located adjacent to and above the lower bearing block 248. The lever 256 is disposed in substantially parallel relation to the lever 258 and is supported between its ends 259 and 260 on a pivot attachment 261 secured to a bracket 262 extending rearwardly from the transverse frame member 82. The link 257 comprises a rod having its ends bent downwardly and adapted to be pivotally held in holes adjacent the end 260 of the lever 256 and in the free end of the lever 258 in such manner that movement of the latter causes cooperative movement of the lever 256 around the pivot attachment 261. The position of the pivot attachment 261 with respect to the lever 256 and the proportions of the levers 256 and 258 is such that a small rotary movement of the lever 258 in response to rotation of the shaft 247 results in a relatively large radial movement of the free end 259 of the lever 256, although the over-all dimensions of the elements of the arrangement permit it to be compactly housed within the vending machine frame 24.

The pivot attachment 261 and its mounting means in the lever 256, in addition to supporting the latter for horizontal rotary movement, permits limited movement of the lever 256 in a vertical plane, and the lever 256 is normally urged into a position wherein its outer end 259 is depressed from the horizontal by means of a tension spring 256' secured between oppositely disposed holes in the lever 249 and the end 260 of the lever 256. The free end 259 of the lever 256 is provided with a vertically extending striker plate 263 secured to its rearwardly facing edge by means of a hinge 264. The striker plate 263 is provided with a forwardly bent end portion 265 whose lower edge contacts the upper surface of the lever 256 preventing rotation of the striker plate 263 forwardly from the vertical. A spring associated with the hinge 264 is disposed to bias the striker plate 263 towards its forward vertical position.

When the vending machine is in its inoperative condition, the containers 22 are secured vertically in the support rack 21 in such a manner that the lower ends of the actuating pins 175 of the dispensing mechanisms 148 lie in a horizontal plane of rotation above the upper edge of the striker plate 263 of the lever 256 and are therefore out of engagement therewith, thus permitting rotation of the support rack 21 by selective action of the control handle 125.

The present vending machine includes interconnecting means between the control systems for the liquid and powdered ingredient dispensing mechanisms to cause their sequential operation, comprising a vertically disposed rod 266 and an elongated lever 267. The rod 266 is supported adjacent and parallel to the tank 23 and is provided at its upper end with a horizontal portion 268 terminating in an eye 269 formed to slidably accommodate the upper end of the rod 217 of the plunger 216 and to be supported between the nut 219 and the upper surface of the slotted end of the actuating arm 220 thus raising of the actuating arm 220 by means of the cable 224 also results in elevating the rod 266.

Figure 15:
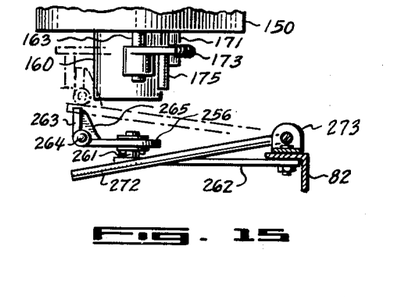
Fig. 15 is a partial view illustrating the interconnection between the control systems for actuating the powdered ingredient dispensing means, and the fluid discharge means.

The lever 267 is generally U-shaped and comprises a central portion 270 and a pair of substantially parallel end portions 271 and 272. The lever 267 is adapted to be supported for swinging movement in a vertical plane by means of a support bracket 273 which is secured to the transverse frame member 82 and engages the central portion 270 with its associated end portions 271 and 272 disposed towards the rear of the machine. The lower end of the rod 266 is adapted for pivotal connection to the distal end of the end portion 271 by means of an adjustable fitting 274 so that movement of the rod 266 results in rotation of the lever 267. With particular reference to Fig. 15, the end portion 272 of the lever 267 is disposed to lie beneath the end 259 of the lever 256 and is adapted to engage its lower surface for the purpose of raising the latter into position for engaging and actuating the actuating pins 175 of the dispensing assemblies 148.

As thus described, the operation of the vending machine comprises the following steps—(1) the desired beverage is selected by rotating the handle 125 on the control plate 126, (2) a coin is inserted through the coin slot 17, (3) the control handle 227 is pulled forward and then released, and (4) when it is seen that the beverage has been prepared behind the window portion 88 of the pivoted frame 87, the handle 91 is lifted and the beverage withdrawn.

Rotation of the selector handle 125 results in positioning the container 22 with the powdered ingredient B corresponding to the beverage chosen, over the delivery position on the delivery frame 81. The action of the coin actuates the coin release mechanism 251 to release the lock bar 250 and to permit rotation of the shaft 247 upon movement of the handle 227. When the handle 227 is drawn forward, the following operations occur simultaneously—(1) the end 235 of the lever 232 is rotated rearwardly resulting in rotation of the actuating ring 52 of the cup release mechanism 49 to release a cup to the delivery position on the delivery frame 81, (2) the plunger 217 is raised in the metering cylinder 206, (3) the rod 266 is raised to rotate the lever 267 upwards, and (4) the end 259 of the lever 256 is rotated forward and is simultaneously raised by the end 272 of the lever 267 so that the striker plate 263 lies in the horizontal plane of the actuating pin 175 of the dispensing mechanism 148 disposed on the container 22 positioned over the delivery position. When the handle 227 is released, the following operations take place—(1) the end 259 of the lever 256 is rotated rearwardly engaging the striker plate 263 against the actuating pin 175 of the selected container causing discharge of a predetermined amount of the contents into the cup A on the delivery position, (2) the lever 220 is permitted to return to its inoperative or depressed position causing the plunger 217 and piston 218 to force a predetermined amount of the liquid C through the pipe 213 into the cup A on the delivery position and simultaneously lowering the lever 267 so that the striker plate 263 is dropped from engagement with the actuating pin 175. Time lag in the liquid dispensing system is such that the striker plate 263 is dropped from engagement with the actuating pin 175 prior to the discharge of the liquid C into the positioned cup A, so that the discharge mechanism 148 is in its normal or closed position when the liquid C is introduced into the cup A thus preventing vapor from contacting the powdered ingredient B within the container 22.

The vending machine of the invention also includes means for indicating that the supply of cups A are exhausted and for preventing its operation when in this condition. This mechanism comprises a generally horizontal lever 275 disposed above the support rack 21 for rotation in aligned holes in the transverse frame member 27 and a bracket 276, an indicating bar 277 supported for sliding movement behind the upper portion of the control plate 126, a coin release actuating bar 278, and a trip member 279.

The bracket 276 is secured at one end to the frame member 129 and extends laterally, having a hole at its outer end accommodating the horizontal lever 275 to serve as a forward bearing for rotation thereof. The indicating bar 277 is supported against the rear face of the control plate 126 above the opening 193 in suitable guides (not shown), and is provided with a slotted end portion 280. An opening 281 is provided through the control plate 126 adjacent the forward face of the indicating bar 277, and the latter is adapted to bear marking such as the words "Cups Out" which is concealed when the bar 278 is moved to the left as shown in Fig. 3 and exposed through the opening 283 when moved to the right. The forward end 282 of the lever 275 extends downwards in assembly and its lower end is positioned in the slotted end 280 of the indicating bar 277. A tension spring 283 is attached to the vertical portion 282 of the lever 275 and to the frame member 129, normally biasing the former to the left as shown.

The rear end of the lever 275 extends downward on assembly to form a vertical end portion 284, the lower end of which is disposed above the plate 30 of the storage frame 20 adjacent its outer periphery. The trip member 279 is secured by bolts to the upper face of the plate 30 and is provided with a vertical portion 285 which is adapted to engage the end portion 284 of the lever 275 on rotation of the storage frame 20 to rotate the latter against the tension spring 283, causing the indicating bar 277 to be moved to the right to expose the marking thereon through the opening 281. The trip member 279 is angularly located on the plate 30 in such manner that it strikes the end portion 284 and causes full rotation of the lever 275, when the last of the tubes 36 of the cup storage frame 20 has been emptied depressing the associated latch member 96 from engagement with the stop lever 103 and permitting the frame 20 to rotate further until the stop lever 103 is limited by engagement with the limit bracket 108. Adjacent the end portion 284, the lever 275 supports a laterally extending arm 286 having a hole in its free end accommodating a bolt 287 which forms a pivotal connection with one end 288 of a locking frame 289. The frame 289 is supported for vertical movement in a guide member 290 suitably supported on the frame 24 and has a depending end portion which is interconnected with the coin release mechanism 251 to lock the latter when the frame 289 is in a lowered or depressed operative position, so that the vending machine is inoperative and a coin inserted in the coin opening 17 will be returned through the bezel 18. The frame 289 is normally held in a raised operative position by a tension spring (not shown). By this means, when the supply of cups A is exhausted from the storage frame 20, the lever 275 is rotated by the trip member 279 to not only expose the "out" marking of the indicating bar 277 through the opening 281, but to depress the frame 289 as a result of downwards rotation of the arm 286, and render the coin release mechanism inoperative as explained.

The vending machine contemplated by the present invention as thus described is characterized as including rotary storage means for a plurality of stacks of nested cups or receptacles, means for successively releasing cups from the stacks to a delivery position, means for automatically and successively positioning the stacks of cups for operation from the releasing means, a rotatable support frame supported co-axially with the receptacle storage means, a plurality of powdered ingredient containers adapted for support around the support frame, a combined sealing and dispensing mechanism associated with each of the containers, control means for selectively positioning one of the containers for discharge of its contents into a cup on the delivery position, means for delivering a pre-determined amount of liquid from the storage tank into a cup positioned on the delivery position and control means for successively (1) releasing a cup to the delivery position, (2) discharging a pre-determined amount of powdered ingredient from one of the containers to the positioned cup, and (3) delivering a pre-determined amount of the liquid to the cup to form a beverage.

Having thus described the invention what we claim as new and desire to secure by Letters Patent is:

1. In a beverage vending machine, a rotatable receptacle storage drum adapted to support stacks of nested receptacles, ejection means for successively releasing receptacles from said storage drum to a delivery position, a plurality of containers for beverage forming ingredients, a frame corotatable and concentric with said drum adapted to support said containers for selective positioning over said delivery position, release means operatively associated with each of said containers to discharge a predetermined amount of said beverage forming ingredient into a receptacle positioned on said delivery position, a liquid storage tank, and metering means for discharging a predetermined amount of liquid into a receptacle on said delivery position.

2. In a beverage vending machine, a rotatable receptacle storage drum adapted to support stacks of nested receptacles, ejection means for successively releasing receptacles from said storage drum to a delivery position, a plurality of containers for beverage forming ingredients, a frame corotatable and concentric with said drum adapted to support said containers for selective positioning over said delivery position, manually operable means connected to rotate said frame and selectively position said containers, release means operatively associated with each of said containers to discharge a predetermined amount of said beverage forming ingredient, a liquid storage tank, metering means for discharging a predetermined amount of liquid into a receptacle on said delivery, and actuating means operatively associated with said ejection means, said rotatable frame, and said metering means adapted on actuation to successively release a receptacle to said delivery position, actuate the release means of the container positioned over said delivery position, and then meter a predetermined amount of liquid from said storage tank.

3. In a beverage vending machine, a rotatable receptacle storage drum adapted to support stacks of nested receptacles, ejection means for successively releasing receptacles from said storage drum to a delivery position, a plurality of containers for beverage forming ingredients, a frame corotatable and concentric with said drum adapted to support said containers for selective positioning over said delivery position, manually-operable means connected to rotate said frame and selectively position said containers, release means operatively associated with each of said containers to discharge a predetermined amount of said beverage forming ingredient, a liquid storage tank, metering means for discharging a predetermined amount of liquid into a receptacle on said delivery position, and mechanical actuating means operatively associated with said ejection means, said rotatable frame, and said metering means adapted on actuation to successively release a receptacle to said delivery position, actuate the release means of the container positioned over said delivery position, and then meter a predetermined amount of liquid for said storage tank.

4. In a beverage vending machine, a rotatable receptacle storage drum adapted to support stacks of nested receptacles, ejection means for successively releasing receptacles from said storage drum to a delivery position, a plurality of containers for beverage forming ingredients, a frame corotatable and concentric with said drum adapted to support said containers for selective positioning over said delivery position, manually operable means connected to rotate said frame and selectively position said containers, release means operatively associated with each of said containers to discharge a predetermined amount of said beverage forming ingredient, a liquid storage tank, metering means for discharging a predetermined amount of liquid into a receptacle on said delivery position, and actuating means comprising a system of levers and linkages operatively associated with said ejection means, said rotatable frame, and said metering means adapted on actuation to successively release a receptacle to said delivery position, actuate the release means of the container positioned over said delivery position, and then meter a predetermined amount of liquid from said storage tank.

5. In a machine adapted for vending materials in open-ended receptacles from a delivery position, the combination of rotatable support means for stacks of nested receptacles, ejection means operatively associated with said support means adapted to successively eject receptacles from said support means to said delivery position, a plurality of ingredient containers concentrically and rotatably supported around said receptacle support means and on the same axis for selective positioning with respect to said delivery position, discharge means associated with each of said containers, and actuating means operatively associated with said frame to discharge the contents of a selectively positioned container into a receptacle in said delivery position.

6. In a machine adapted for vending materials in open-ended receptacles from a delivery position, the combination of a vertically rotatable drum comprising support means for a plurality of stacks of nested receptacles, ejection means operatively associated with said drum adapted to successively eject receptacles from said support means to said delivery position, a concentric and co-rotatable frame having means for supporting a plurality of removable containers for selective positioning with respect to said delivery position and release means for discharging the contents of a selectively positioned container into a receptacle in said delivery position.

7. In a machine adapted for vending materials in open-ended receptacles from a delivery position, the combination of a vertically rotatable drum comprising support means for a plurality of stacks of nested receptacles, ejection means operatively associated with said drum adapted to successively eject receptacles from said support means to said delivery position, a plurality of ingredient containers having means for dispensing and agitating the contents thereof, a frame concentric and co-rotatable with said drum having means for supporting said containers for selective positioning thereof with respect to said delivery position, and actuating means associated with said frame for discharging a predetermined amount of the contents of a selectively positioned container into a receptacle in said delivery position.

8. In a machine for vending beverages in receptacles including a liquid storage tank, means for positively discharging a predetermined volume of liquid from said storage tank into a receptacle comprising cylinder means having a closed end portion adapted to be disposed beneath the liquid level of said tank, port means through said cylinder adapted to be disposed above said closed end portion and below the liquid level of said tank, a weighted piston substantially conforming to said cylinder and adapted for reciprocation therein to open and close said port means, means for elevating said piston above said port means, means for releasing said elevating means, and discharge means communicating with said cylinder below said port means.

9. In a vending machine, storage and releasing means for receptacles comprising a vertically rotatable frame, a plurality of open-ended tubular members associated with said frame for supporting stacked receptacles therein, a fixed support member disposed beneath said tubular members having an opening aligned with the path of said tubular members, ejection means operatively associated with said opening adapted to successively eject receptacles from a tubular member aligned with said opening, resilient means biasing said frame in rotation, and locking means associated with each of said tubular members operable to hold said frame against rotation with said tubular member aligned with said opening when a receptacle is supported in said tubular member and actuable to release said frame for rotation in response to said biasing means when all of the receptacles are withdrawn therefrom.

10. In a vending machine, storage and releasing means for receptacles comprising a vertically rotatable frame, a plurality of open-ended tubular members associated with said frame for supporting receptacles in stacked relation therein, a stationary plate disposed beneath said tubular members having an opening aligned with the path of said tubular members, ejection means operatively associated with said opening adapted to successively eject receptacles from a tubular member aligned with said opening, resilient means biasing said frame in rotation, stop means adjacent said frame, and latch means associated with each of said tubular members operable to engage said stop means and hold said frame against rotation with said tubular member aligned with said opening when a receptacle is supported in said tubular member and actuable to release said frame for rotation in response to said biasing means when all of the receptacles are withdrawn therefrom.

11. In a vending machine, storage and releasing means for open-ended receptacles comprising a vertical shaft, a frame mounted for rotation on said shaft, a plurality of open-ended tubular members associated with said frame for supporting receptacles in stacked relation therein, a stationary plate disposed beneath said tubular members having an opening aligned with the path of said tubular members, ejection means operatively associated with said opening adapted to positively and successively eject receptacles from a tubular member aligned with said opening, spring means operatively connected to said shaft and said frame biasing said frame in rotation, limit means associated with said frame for restricting the rotation thereof with respect to said shaft, stop means adjacent said shaft, and latch means associated with each of said tubular members operable to engage said stop means and hold said frame against rotation with said tubular member aligned with said opening when a receptacle is supported in said tubular member and actuable to release said frame for rotation when all of the receptacles are withdrawn therefrom.

12. A machine for vending beverages formed by the infusion of a liquid with a dry beverage-forming ingredient in a receptacle, comprising receptacle storage means adapted to support a plurality of nested stacks of receptacles, ejection means operatively associated therewith for successively releasing receptacles from said receptacle storage means to a delivery position and having an actuating element to cause successive release of said receptacles, a container for storing dry beverage-forming ingredients provided with a discharge device having an inoperative position whereby the contents thereof are sealed and an operative position whereby a predetermined amount of the contents of the container is discharged, a frame corotatable with said storage means having means for supporting a plurality of said containers adapted to selectively position said containers to cause discharge of the contents of one container into a receptacle on said delivery position upon actuation of the associated discharge device, a first control member operatively connected to said movable frame for selective positioning of said containers with respect to said delivery position, a liquid storage tank, metering means associated with said storage tank having a conduit for delivering a predetermined amount of liquid to a receptacle on said delivery position, and a second control member operatively connected to said receptacle ejection device and said metering means and to actuating means adapted to operate the discharge device of the container associated with said delivery position whereby actuation of said second control member successively causes (1) actuation of said receptacle ejection device to release a receptacle to said delivery position, (2) operation of the discharge device of the container associated with said delivery position to discharge a predetermined amount of the contents of said container into said released receptacle, and (3) actuation of said metering device to deliver a predetermined amount of liquid from said liquid storage tank to said released receptacle.

13. A machine for vending beverages formed by the infusion of a liquid with a dry beverage-forming ingredient in a receptacle, comprising receptacle storage means adapted to support a nested stack of receptacles, ejection means operatively associated therewith for successively releasing receptacles from said receptacle storage means to a delivery position and having an actuating element to cause successive release of said receptacles, a container for storing dry beverage-forming ingredients provided with a discharge device having an inoperative position whereby the contents thereof are sealed and an operative position whereby a predetermined amount of the contents of the container is discharged, a movable frame having means for supporting a plurality of said containers adapted to selectively position said containers to cause discharge of the contents of one container into a receptacle on said delivery position upon actuation of the associated discharge device, a first control member operatively connected to said movable frame for selective positioning of said containers with respect to said delivery position, a liquid storage tank, metering means associated with said storage tank having a conduit for delivering a predetermined amount of liquid to a receptacle on said delivery position, and a second control member operatively connected by means of a system of levers to said receptacle ejection device and said metering means and to an actuating lever adapted to operate the discharge device of the container associated with said delivery position whereby actuation of said second control member successively causes (1) actuation of said receptacle ejection device to release a receptacle to said delivery position, (2) operation of the discharge device of the container associated with said delivery position to discharge a predetermined amount of the contents of said container into said released receptacle, and (3) actuation of said metering device to deliver a predetermined amount of liquid from said liquid storage tank to said released receptacle.

14. A machine for vending beverages formed by the infusion of a liquid with a dry beverage-forming ingredient in a receptacle, comprising receptacle storage means adapted to support a nested stack of receptacles, ejection means operatively associated therewith for successively releasing receptacles from said receptacle storage means to a delivery position and having an actuating element to cause successive release of said receptacles, a container for storing dry beverage-forming ingredients provided with a discharge device having an inoperative position whereby the contents thereof are sealed and an operative position whereby a predetermined amount of the contents of the container is discharged, a movable frame having means for supporting a plurality of said containers adapted to selectively position said containers to cause discharge of the contents of one container into a receptacle on said delivery position upon actuation of the associated discharge device, a first control member operatively connected to said movable frame for selective positioning of said containers with respect to said delivery position, a liquid storage tank, metering means associated with said storage tank having a conduit for delivering a predetermined amount of liquid to a receptacle on said delivery position, a second control member operatively connected to said receptacle ejection device and said metering means and to actuating means adapted to operate the discharge device of the container associated with said delivery position whereby actuation of said second control member successively causes (1) actuation of said receptacle ejection device to release a receptacle to said delivery position, (2) operation of the discharge device of the container associated with said delivery position to discharge a predetermined amount of the contents of said container into said released receptacle, and (3) actuation of said metering device to deliver a predetermined amount of liquid from said liquid storage tank to said released receptacle, and interconnecting means operatively associated between said metering means and said discharge device actuating means whereby the delivery of liquid from said metering device is prevented until said discharge device has returned to its inoperative position.

15. A machine for vending beverages formed by the infusion of a liquid with a dry beverage-forming ingredient in a receptacle, comprising receptacle storage means adapted to support a nested stack of receptacles, ejection means operatively associated therewith for successively releasing receptacles from said receptacle storage means to a delivery position and having an actuating arm to cause successive release of said receptacles, a container for storing dry beverage-forming ingredients provided with a discharge device having an inoperative position whereby the contents thereof are sealed and an operative position whereby a predetermined amount of the contents of the container is discharged, a rotatable frame having means for supporting a plurality of said containers adapted to selectively position said containers to cause discharge of the contents of one container into a receptacle on said delivery position upon actuation of the associated discharge device, a first manually operable control member mechanically connected to said movable frame for selective positioning of said containers with respect to said delivery position, a liquid storage tank, metering means including a cylinder and piston associated with said storage tank having a conduit from said cylinder for delivering a predetermined amount of liquid to a receptacle on said delivery position, and a second control member operatively connected to said receptacle ejection device and the piston of said metering means and to actuating means adapted to operate the discharge device of the container associated with said delivery position whereby actuation of said second control member successively causes (1) actuation of the actuating arm of said receptacle ejection device to release a receptacle to said delivery position, (2) operation of the discharge device of the container associated with said delivery position to discharge a predetermined amount of the contents of said container into said released receptacle, and (3) actuation of the said piston of said metering device to deliver a predetermined amount of liquid from said liquid storage tank to said released receptacle.

16. A machine for vending beverages formed by the infusion of a liquid with a dry beverage-forming ingredient in a receptacle, comprising receptacle storage means adapted to support a nested stack of receptacles, ejection means operatively associated therewith for successively releasing receptacles from said receptacle storage means to a delivery position and having an actuating arm to cause successive release of said receptacles, a container for storing dry beverage-forming ingredients provided with a discharge device having an inoperative position whereby the contents thereof are sealed and an operative position whereby a predetermined amount of the contents of the container is discharged, a rotatable frame having means for supporting a plurality of said containers adapted to selectively position said containers to cause discharge of the contents of one container into a receptacle on said delivery position upon actuation of the associated discharge device, a first manually operable control member mechanically connected to said movable frame for selective positioning of said containers with respect to said delivery position, a liquid storage tank, metering means including a cylinder and piston associated with said storage tank having a conduit from said cylinder for delivering a predetermined amount of liquid to a receptacle on said delivery position, and a second control member operatively connected by a system of levers to said receptacle ejection device and the piston of said metering means and to an actuating lever adapted to operate the discharge device of the container associated with said delivery position whereby actuation of said second control member successively causes (1) actuation of the actuating arm of said receptacle ejection device to release a receptacle to said delivery position, (2) operation of the discharge device of the container associated with said delivery position to discharge a predetermined amount of the contents of said container into said released receptacle, and (3) actuation of the said piston of said metering device to deliver a predetermined amount of liquid from said liquid storage tank to said released receptacle.

References Cited in the file of this patent
UNITED STATES PATENTS

| | | |
|---|---|---|
| 2,374,168 | Bowman | Apr. 24, 1945 |
| 2,374,430 | Hexter | Apr. 24, 1945 |
| 2,542,067 | Waite et al. | Feb. 20, 1951 |
| 2,552,856 | Knapp | May 15, 1951 |
| 2,614,731 | White | Oct. 21, 1952 |
| 2,614,738 | Mills | Oct. 21, 1952 |